United States Patent
Omori et al.

(10) Patent No.: US 7,678,207 B2
(45) Date of Patent: Mar. 16, 2010

(54) STEEL PRODUCT FOR INDUCTION HARDENING, INDUCTION-HARDENED MEMBER USING THE SAME, AND METHODS PRODUCING THEM

(75) Inventors: Yasuhiro Omori, Okayama (JP); Tohru Hayashi, Okayama (JP); Akihiro Matsuzaki, Okayama (JP); Takaaki Toyooka, Okayama (JP)

(73) Assignee: JFE Steel Corporation (JP)

( * ) Notice: Subject to any disclaimer, the term of this patent is extended or adjusted under 35 U.S.C. 154(b) by 307 days.

(21) Appl. No.: 10/526,916

(22) PCT Filed: Jan. 13, 2004

(86) PCT No.: PCT/JP2004/000151

§ 371 (c)(1),
(2), (4) Date: Mar. 7, 2005

(87) PCT Pub. No.: WO2004/065646

PCT Pub. Date: Aug. 5, 2004

(65) Prior Publication Data

US 2006/0162823 A1    Jul. 27, 2006

(30) Foreign Application Priority Data

Jan. 17, 2003    (JP)    ............... 2003-009349
Jul. 30, 2003    (JP)    ............... 2003-203735
Dec. 9, 2003    (JP)    ............... 2003-410792

(51) Int. Cl.
C21D 1/10    (2006.01)

(52) U.S. Cl. ............... 148/567

(58) Field of Classification Search ............... 148/567
See application file for complete search history.

(56) References Cited

U.S. PATENT DOCUMENTS 6,602,358 B1 *    8/2003    Ochi et al. ............... 148/328
6,660,105 B1 *    12/2003    Ochi et al. ............... 148/320
7,083,688 B2 *    8/2006    Asano et al. ............... 148/663

(Continued)

FOREIGN PATENT DOCUMENTS

EP    1 178 126 A1    2/2002

(Continued)

OTHER PUBLICATIONS

Translation of JP10036937A.*

*Primary Examiner*—Roy King
*Assistant Examiner*—Jie Yang
(74) *Attorney, Agent, or Firm*—DLA Piper LLP (US)

(57) ABSTRACT

We provide a steel product that includes, by mass %, C: 0.35-0.7%, Si: 0.30-1.1%, Mn: 0.2-2.0%, Al: 0.005-0.25%, Ti: 0.005-0.1%, Mo: 0.05-0.6%, B: 0.0003-0.006%, S: 0.06% or less, P: 0.02% or less, Cr: 0.2% or less, and the balance Fe and inevitable impurities, and has a structure of bainite and/or martensite, the total volume fraction of bainite and martensite being 10% or more, and an induction hardened member that is made of the steel product having a hardened surface layer formed by induction hardening and has a prior austenite grain size of 12 μm or less through the layer thickness. The member has high fatigue strength and therefore is suitable for an automobile drive shaft, an automobile constant velocity joint or the like.

8 Claims, 2 Drawing Sheets

U.S. PATENT DOCUMENTS

2001/0015241 A1    8/2001    Tajima et al.

FOREIGN PATENT DOCUMENTS

| JP | 07 090484 A | 4/1995 |
| JP | 8-53714 A | 2/1996 |
| JP | 08 053714 A | 2/1996 |
| JP | 10 008136 A | 1/1998 |
| JP | 10036937 A * | 2/1998 |
| JP | 10 219392 A | 8/1998 |
| JP | 11-131176 A | 5/1999 |
| JP | 2000-154828 A | 6/2000 |
| JP | 2002-3943 A | 1/2002 |
| JP | 2004-8252 | 1/2004 |

* cited by examiner

STEEL PRODUCT FOR INDUCTION HARDENING, INDUCTION-HARDENED MEMBER USING THE SAME, AND METHODS PRODUCING THEM

TECHNICAL FIELD

This disclosure relates to a steel product suitable for an automobile drive shaft, an automobile constant velocity joint or the like that is to be induction hardened to have a hardened layer on the surface, and to an induction hardened member made of the steel product. The disclosure also relates to methods for manufacturing the steel product and the induction hardened member.

BACKGROUND

In general, a machine structural member, such as an automobile drive shaft or an automobile constant velocity joint, is provided with high fatigue strength, such as torsional fatigue strength, bending fatigue strength, and roller pitting fatigue strength, which are all important characteristics for the machine structural member, by working a hot rolled steel bar into a member with a predetermined shape through hot forging, cutting, cold forging and the like, followed by induction hardening and tempering.

In recent years, further improvement in the fatigue strength of such a machine structural member has been required as the demand for weight reduction of automobile members increases in view of environmental issues.

Various methods have been proposed to improve the fatigue strength. For example, increasing the depth of induction hardening may be expected to improve the torsional fatigue strength. However, the torsional fatigue strength levels off at a certain depth, no further improvement being realized.

Increasing grain boundary strength is also effective in improving the torsional fatigue strength. For example, Japanese Unexamined Patent Application Publication No. 2000-154819 discloses a method for decreasing the austenite grain size by dispersing a large amount of fine TiC during induction heating.

However, the dispersion of a large amount of fine TiC during induction heating requires that the steel should be heated to at least 1100° C. for solution treatment of TiC in advance. This results in low productivity. Furthermore, only decreasing the austenite grain size by the dispersion of a large amount of fine TiC is not sufficient to satisfy the recent demand for torsional fatigue strength.

Japanese Unexamined Patent Application Publication No. 8-53714 discloses a machine structural component with improved torsional fatigue strength, in which a value A that is calculated from CD/R, γf, Hf, and Hc is adjusted within a predetermined range depending on the C content, wherein CD/R is the ratio of the thickness (case depth) CD of a hardened layer formed by induction hardening of the machine structural component having a circular cross section to the radius R of the circular cross section, the CD/R being limited to 0.3-0.7; γf is prior austenite grain size through the depth up to 1 mm in the induction hardened layer; Hf is average Vickers hardness of an as-quenched component in the CD/R range up to 0.1; and Hc is average Vickers hardness at an axial center after the induction hardening.

However, since the prior austenite grain size through the depth of the hardened layer is not taken into consideration in this machine structural component, the recent demand for torsional fatigue strength is not satisfied, either.

It could therefore be advantageous to provide a steel product for induction hardening which allows higher fatigue strength than ever before after induction hardening, and an induction hardened member with high fatigue strength prepared from the steel product. It could also be advantageous to provide a method for manufacturing the steel product and the induction hardened member.

SUMMARY

We provide a steel product for induction hardening that consists of
C: 0.35-0.7%,
Si: 0.30-1.1%,
Mn: 0.2-2.0%,
Al: 0.005-0.25%,
Ti: 0.005-0.1%,
Mo: 0.05-0.6%,
B: 0.0003-0.006%,
S: 0.06% or less,
P: 0.02% or less,
Cr: 0.2% or less, by mass, and
a balance of Fe and inevitable impurities,
and has a structure of bainite and/or martensite, the total volume fraction of bainite and martensite being 10% or more, and
an induction hardened member that is made of the steel product wherein the prior austenite grain size is 12 μm or less through the thickness of a hardened surface layer formed by induction hardening.

This steel product for induction hardening may be manufactured by a method comprising the steps of: hot working a steel consisting of the components described above; and cooling the hot worked steel at a cooling rate of at least 0.2° C./s.

The induction hardened member may be manufactured by a method comprising the step of: subjecting the steel product to induction hardening at least once, wherein the final induction hardening is performed at a heating temperature of 800-1000° C.

DETAILED DESCRIPTION

We made extensive research for efficiently improving the fatigue strength of a steel product by induction hardening, particularly the torsional fatigue strength as a typical example of the fatigue strength, and obtained the following findings:

(1) Controlling the chemical composition of a steel product within a proper range and adjusting the prior austenite grain size through the thickness of a hardened layer formed by induction hardening to 12 μm or less increase the torsional fatigue strength remarkably. In particular, controlling the Si content and the Mo content within proper ranges increases the number of nucleation sites of austenite during induction hardening, inhibits the grain growth of austenite, and effectively decreases the grain size of the hardened layer, thus increasing the torsional fatigue strength. The addition of 0.30 mass % or more Si is effective in decreasing the prior austenite grain size through the thickness of the hardened layer to 12 μm or less.

(2) Since carbides disperse more finely in bainite or martensite than in ferrite+pearlite, when the total volume fraction of bainite and martensite in a steel product is at least 10% before induction hardening, the area of ferrite/carbide interface, which is a nucleation site of austenite during induction heating, increases and thereby the resulting austenite becomes fine. Consequently, this decreases the grain size of the hardened layer, increases the grain boundary strength, and thus increases the torsional fatigue strength.

(3) The prior austenite grain size can consistently be decreased to 12 μm or less through the thickness of the hardened layer by using a steel product having a controlled chemical composition and a controlled structure as described above, and heating the steel product at 800-1000° C., preferably at 800-950° C. for 5 seconds or less during induction hardening. In particular, the addition of Mo efficiently decreases the grain size of the hardened layer in this heating temperature range. In addition, repetitive induction hardening provides a hardened layer having finer grains than single induction hardening.

1. Steel Product for Induction Hardening
1-1. Composition

C: C has the largest effect on the induction hardenability. C increases the hardness and the thickness of a hardened layer, and thereby improves the torsional fatigue strength. However, when the C content is 0.35 mass % or less, the hardened layer has to be increased in thickness dramatically to ensure a required torsional fatigue strength. This causes frequent occurrence of quenching cracks and makes the formation of bainite difficult. On the other hand, when the C content is greater than 0.7 mass %, the grain boundary strength decreases and therefore the torsional fatigue strength decreases. This also results in poor machinability, poor cold forgeability, and poor resistance to quenching crack. Accordingly, the C content is limited to 0.35-0.7 mass %, preferably to 0.4-0.6 mass %.

Si: Si increases the number of nucleation sites of austenite during induction heating, inhibits the grain growth of austenite, and thereby decreases the grain size of the hardened layer. Furthermore, Si inhibits the formation of carbides and therefore prevents a reduction in the grain boundary strength. Si is also suitable for the formation of bainite. Thus, Si is very effective in increasing the torsional fatigue strength. However, when the Si content is less than 0.30 mass %, the prior austenite grain size through the thickness of the hardened layer cannot be decreased to 12 μm or less under any condition for manufacturing a steel product and any induction hardening condition. On the other hand, the Si content greater than 1.1 mass % causes too much solid solution hardening of ferrite, resulting in poor machinability and poor cold forgeability. Accordingly, the Si content is limited to 0.30-1.1 mass %, preferably to 0.40-1.0 mass %.

Mn: Mn improves the induction hardenability and therefore is essential for the formation of a hardened layer having a certain thickness. However, less than 0.2 mass % of Mn is insufficient for the effect. On the other hand, when the Mn content is greater than 2.0 mass %, retained austenite after induction hardening increases and thus the surface hardness decreases. This results in lower torsional fatigue strength. Accordingly, the Mn content is limited to 0.2 mass %, preferably 0.3 mass %, to 2.0 mass %. Furthermore, since a high Mn content may cause hardening of the as-rolled steel and therefore result in poor machinability, the Mn content is preferably 1.2 mass % or less, and more preferably 1.0 mass % or less.

Al: Al is effective in deoxidizing steel. Al is also effective in inhibiting the grain growth of austenite during induction heating and thus decreasing the grain size of a hardened layer. However, less than 0.005 mass % of Al is insufficient for the effect. On the other hand, the effect levels off at an Al content exceeding 0.25 mass %, increasing the cost. Accordingly, the Al content is limited to 0.005-0.25 mass %, preferably to 0.05-0.10 mass %.

Ti: Ti combines with inevitable impurity N in steel and thereby prevents B from forming BN and losing its effect on the induction hardenability, as described below. This requires at least 0.005 mass % of Ti. However, when the Ti content is greater than 0.1 mass %, TiN is produced in excess and becomes origin of fatigue fracture, which remarkably decreases the torsional fatigue strength. Accordingly, the Ti content is limited to 0.005-0.1 mass %, preferably to 0.01-0.07 mass %. Furthermore, to ensure the precipitation of N as TiN, and utilize the hardening effect of B effectively to produce a structure of bainite and martensite, the Ti content and the N content are preferably controlled to satisfy the equation of Ti (mass %)/N (mass %)≧3.42.

Mo: Mo enhances the formation of bainite after hot working, decreases the austenite grain size during induction heating, and decreases the grain size of a hardened layer. Furthermore, Mo inhibits the grain growth of austenite during induction heating and thus decreases the grain size of the hardened layer. In particular, when the induction heating is conducted at 800-1000° C., preferably at 800-950° C., the grain growth of austenite can be inhibited significantly. In addition, Mo is effective in improving the induction hardenability and is therefore used to adjust the hardenability. Furthermore, Mo inhibits the formation of carbides at a grain boundary and thus prevents a decrease in the grain boundary strength.

As such, Mo plays a very important role. However, when the Mo content is less than 0.05 mass %, the prior austenite grain size through the thickness of the hardened layer cannot be decreased to 12 μm or less under any condition for manufacturing a steel product and any induction hardening condition. On the other hand, when the Mo content is greater than 0.6 mass %, the hardness of a steel product increases remarkably during rolling. This results in poor workability. Accordingly, the Mo content is limited to 0.05-0.6 mass %, preferably to 0.1-0.6 mass %, and more preferably to 0.3-0.4 mass %.

B: B enhances the formation of bainite or martensite. A small quantity of B improves the induction hardenability, increases the thickness of a hardened layer, and thus increases the torsional fatigue strength. Furthermore, B segregates preferentially at a grain boundary and decreases the concentration of P segregated at the grain boundary, thus increasing the grain boundary strength and the torsional fatigue strength. However, less than 0.0003 mass % of B is insufficient for the effects. On the other hand, the effects level off at a B content of 0.006 mass %, increasing the cost. Accordingly, the B content is limited to 0.0003-0.006 mass %, preferably to 0.0005-0.004 mass %, and more preferably to 0.0015-0.003 mass %.

S: S precipitates as MnS, which improves the machinability of steel. When the S content is greater than 0.06 mass %, S segregates at a grain boundary and thus decreases the grain boundary strength. Accordingly, the S content is limited to 0.06 mass % or less, and preferably to 0.04 mass % or less.

P: P segregates at an austenite grain boundary, and thus decreases the grain boundary strength and the torsional fatigue strength. Furthermore, P increases quenching cracks.

Accordingly, the P content is limited to 0.020 mass % or less and is preferably as low as possible.

Cr: Cr stabilizes carbides and thus enhances the formation of carbides at a grain boundary, decreases the grain boundary strength, and thus decreases the torsional fatigue strength. Accordingly, the Cr content is limited to 0.2 mass % or less, preferably to 0.05 mass % or less, and is more preferably as low as possible.

In addition to the composition described above, further comprising at least one selected from the group consisting of
Cu: 1.0 mass % or less,
Ni: 3.5 mass % or less,
Co: 1.0 mass % or less,
Nb: 0.1 mass % or less, and
V: 0.5 mass % or less, is effective in increasing the torsional fatigue strength for the following reasons.

Cu: Cu is effective in improving the induction hardenability. Furthermore, Cu dissolves in ferrite and increases the torsional fatigue strength by solid-solution strengthening. In addition, Cu inhibits the formation of carbides and prevents a decrease in the grain boundary strength, thus increasing the torsional fatigue strength. However, the Cu content greater than 1.0 mass % causes cracking during hot working. Accordingly, the Cu content is limited to 1.0 mass % or less, and preferably to 0.5 mass % or less.

Ni: Ni improves the induction hardenability and is therefore used to control the hardenability. Furthermore, Ni inhibits the formation of carbides and prevents a decrease in the grain boundary strength, thus improving the torsional fatigue strength. However, since Ni is a very expensive element, the Ni content greater than 3.5 mass % considerably increases the cost of a steel product. Accordingly, the Ni content is limited to 3.5 mass % or less. In addition, since less than 0.05 mass % of Ni only achieves a minor improvement of hardenability or a small effect of preventing a decrease in the grain boundary strength, the Ni content is preferably at least 0.05 mass %, and more preferably 0.1-1.0 mass %.

Co: Co inhibits the formation of carbides and prevents a decrease in the grain boundary strength, thus improving the torsional fatigue strength. However, Co is a very expensive element and the Co content greater than 1.0 mass % considerably increases the cost of a steel product. Accordingly, the Co content is limited to 1.0 mass % or less. In addition, since less than 0.01 mass % of Co has a minor effect of preventing a decrease in the grain boundary strength, the Co content is preferably at least 0.01 mass %, and more preferably 0.02-0.5 mass %.

Nb: Nb not only improves the induction hardenability, but also combines with C or N to improve the strength by precipitation hardening. Furthermore, Nb increases the resistance to temper softening. These effects increase the torsional fatigue strength, although they level-off at a Nb content of 0.1 mass %. Accordingly, the Nb content is limited to 0.1 mass % or less. In addition, since less than 0.005 mass % of Nb achieves a weak precipitation hardening and only a minor improvement in the resistance to temper softening, the Nb content is preferably at least 0.005 mass %, and more preferably 0.01-0.05 mass %.

V: V combines with C or N to improve the strength by precipitation hardening. Furthermore, V increases the resistance to temper softening. These effects increase the torsional fatigue strength, although they level off at a V content of 0.5 mass %. Accordingly, the V content is limited to 0.5 mass % or less. In addition, since less than 0.01 mass % of V achieves only a small increase in the torsional fatigue strength, the V content is preferably at least 0.01 mass %, and more preferably 0.03-0.3 mass %.

1-2. Structure

To improve the torsional fatigue strength by induction hardening, in addition to the composition of a steel product described in section 1-1, the steel product should have a structure of bainite and/or martensite before induction hardening, the total volume fraction (percent by volume) of bainite and martensite being at least 10%, preferably at least 20% for the following reason. Since carbides disperse more finely in a structure of bainite or martensite than in a structure of ferrite+pearlite, the area of ferrite/carbide interface, which is a nucleation site of austenite during induction heating, increases and thereby the resulting austenite becomes smaller. Consequently, this decreases the grain size of a hardened layer, increases the grain boundary strength, and thus increases the torsional fatigue strength.

When the total volume fraction of bainite and martensite exceeds 90%, not only may the decrease in the prior austenite grain size in the hardened layer level off, but also the machinability may deteriorate significantly. Hence, the total volume fraction of bainite and martensite is preferably 90% or less.

Figure 1:
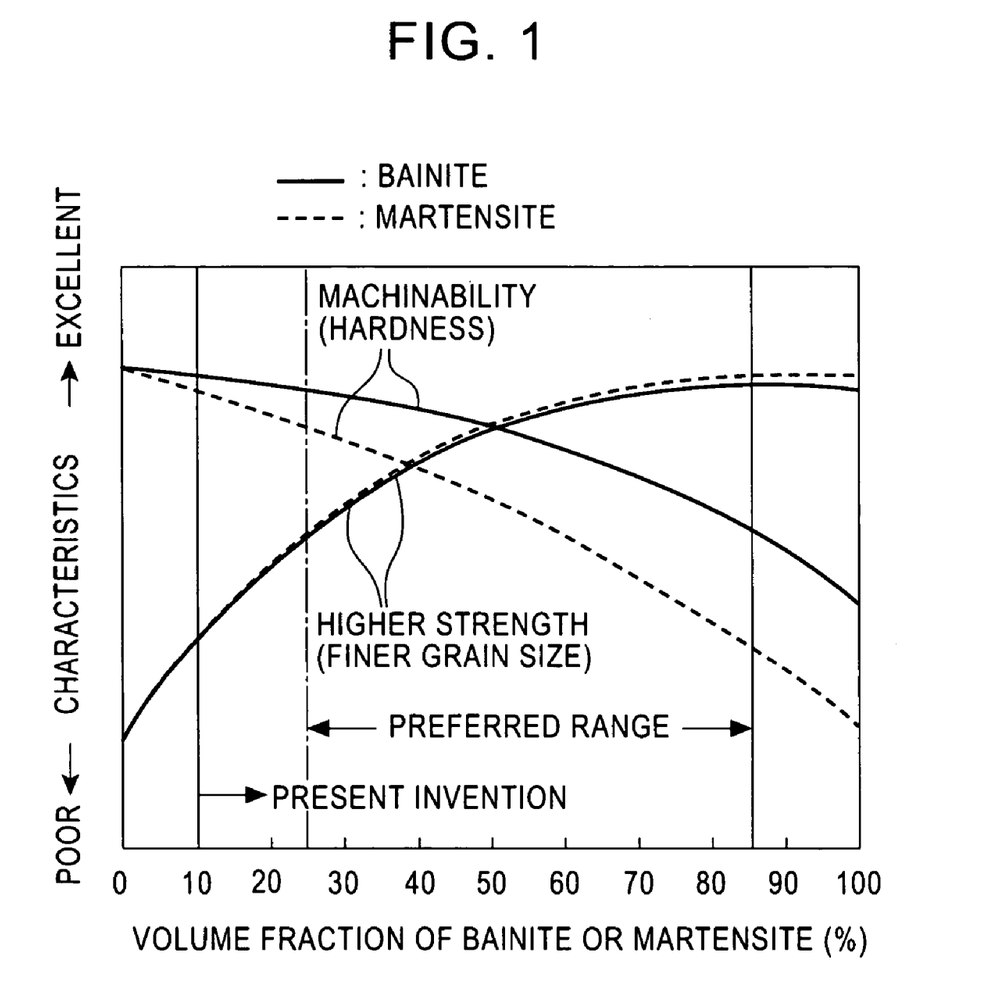
FIG. 1 shows a relationship between volume fraction of bainite or martensite and machinability and increase in strength.

FIG. 1 shows a relationship between volume fraction of bainite or martensite and machinability and increase in strength.

In view of an increase in strength, that is, a decrease in grain size of a hardened layer, bainite has a comparable effect as martensite; at least 10% of volume fraction of bainite or martensite will be sufficient to achieve a significant increase in the torsional fatigue strength. On the other hand, in view of machinability or hardness, bainite is superior to martensite: 25-85% by volume, preferably 30-70% by volume of bainite provides both higher strength and excellent machinability.

From the industrial point of view, bainite also has the advantage over martensite in that bainite is formed with a lesser amount of alloying elements at a lower cooling rate.

The remaining structure other than bainite and martensite is not limited and may be ferrite and/or pearlite.

2. Induction Hardened Member

To manufacture an induction hardened member with high torsional fatigue strength by induction hardening the steel product that has such a composition and structure, the prior austenite grain size of a hardened layer formed on the surface of the member should be 12 μm or less, preferably 10 μm or less, and more preferably 5 μm or less through the thickness of the hardened layer. When the prior austenite grain size of the hardened layer exceeds 12 μm, the grain boundary strength is insufficient, and the improvement in torsional fatigue strength is not expected.

The prior austenite grain size through the thickness of the hardened layer was determined as described below.

After induction hardening, the top surface layer of the member has 100% by area of martensite. The martensite continues to exist at 100% by area to a certain depth from the top and then decreases rapidly. In the member after induction hardening, a layer between the top surface and a region having 98% by area of martensite is herein referred to as a hardened layer, and the average depth from the top is regarded as the depth of the hardened layer.

Average prior austenite grain sizes at one-fifth, a half, and four-fifths of the depth of the hardened layer were measured. When all the average prior austenite grain sizes were 12 μm or less, the prior austenite grain size through the thickness of the hardened layer was considered to be 12 μm or less.

The cross-section of the hardened layer was exposed to an etchant that was prepared by adding 11 g of sodium dodecylbenzenesulfonate, 1 g of ferrous chloride, 1.5 g of oxalic acid and 50 g of picric acid to 500 g of water. The average prior austenite grain size was determined by observing five fields of view of the etched cross-section for each position with an optical microscope at a magnification from 400× (area of one field of view: 0.25 mm×0.225 mm) to 1000× (area of one field of view: 0.10 mm×0.09 mm) and using an image analyzer.

If the fatigue strength depends only on the outermost structure, like rolling contact test, even a hardened layer having a thickness of about 1 mm has some effect. However, for torsional fatigue strength, the hardened layer preferably has a thickness of at least 2 mm, more preferably at least 2.5 mm, and most preferably at least 3 mm.

3. Method for Manufacturing a Steel Product for Induction Hardening

Steel having the above mentioned composition is processed by hot working, such as rolling or forging, into a predetermined shape, and then cooled at an average cooling rate of at least 0.2° C./s to yield a steel product. This steel product has a structure of bainite and/or martensite and is suitable for induction hardening, the total volume fraction of bainite and martensite being at least 10%.

The hot working at a temperature of 900° C. or less does not yield a required structure of bainite and/or martensite. On the other hand, the hot working at a temperature over 1150° C. results in higher heating cost. Accordingly, the hot working is preferably performed at from more than 900° C. to 1150° C. The cooling rate after the hot working is preferably 0.3-30° C./s.

4. Method for Manufacturing an Induction Hardened Member

The steel product for induction hardening having the composition and the structure as described above is cold rolled, cold forged, or cut, if necessary, and is subjected to induction hardening at least once. The final induction hardening is performed at a heating temperature of 800-1000° C., preferably at 800-950° C. The induction hardened member thus manufactured has the prior austenite grain size of 12 μm or less through the thickness of the hardened layer formed on the surface of the steel product and exhibits high torsional fatigue strength.

When the heating temperature during the induction hardening is less than 800° C., the formation of austenite is insufficient and therefore a hardened layer is not completely formed. This results in low torsional fatigue strength. On the other hand, the heating temperature over 1000° C. promotes the grain growth of austenite. This increases the austenite grain size, leading to the formation of coarse grains in the hardened layer and therefore to lower torsional fatigue strength.

Figure 2:
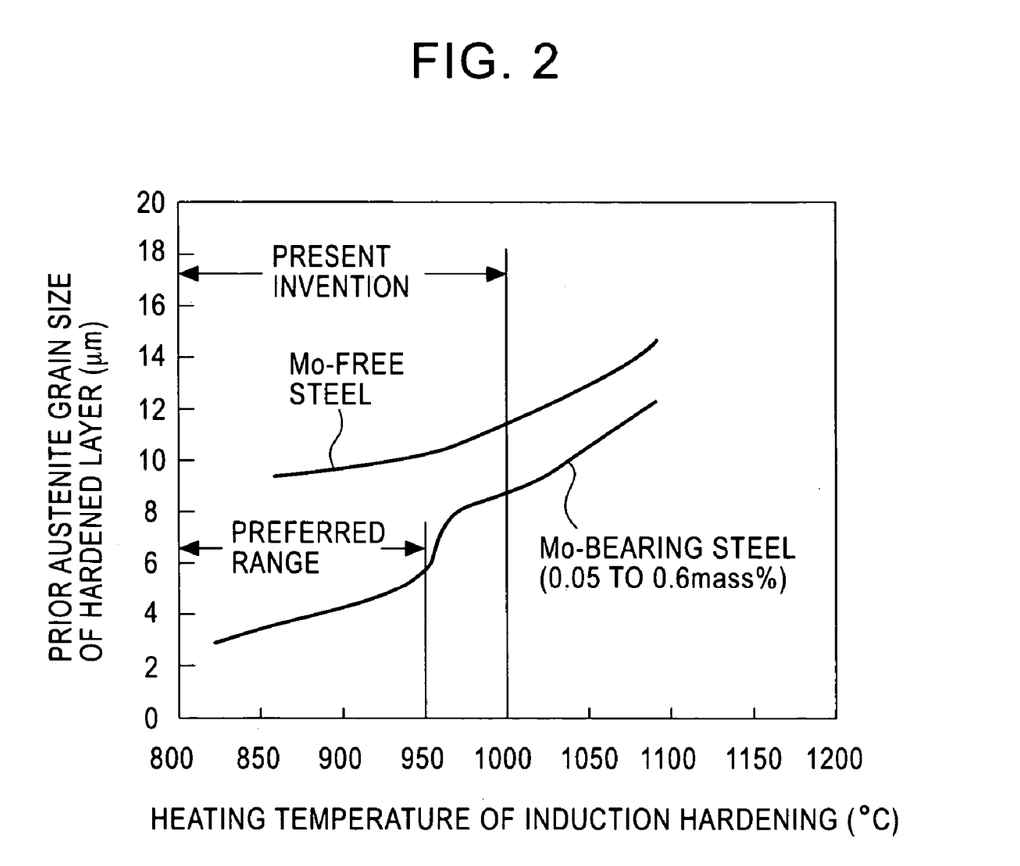
FIG. 2 shows a relationship between heating temperature of induction hardening and prior austenite grain size of hardened layer in Mo-bearing steel and Mo-free steel.

FIG. 2 shows a relationship between heating temperature of induction hardening and prior austenite grain size of hardened layer in a Mo-bearing steel (Mo: 0.05-0.6 mass %) and a comparative Mo-free steel.

Lower heating temperature of the induction hardening in both the Mo-bearing steel and the Mo-free steel gives a smaller prior austenite grain size of the hardened layer. In the Mo-bearing steel, the heating temperature of 1000° C. or less, preferably 950° C. or less makes it possible to remarkably decrease the prior austenite grain size of the hardened layers.

The grain size of the hardened layer is further decreased by repetitive induction hardening. In the repetitive induction hardening, not only the heating temperature of the final induction-hardening, but also the other heating temperatures are preferably 800-1000° C.

Furthermore, in the repetitive induction hardening, the thickness of the hardened layer after the final induction hardening is preferably equivalent to or thicker than that of the hardened layer after the non-final induction hardening. This is because the grain size of the hardened layer is most affected by the final induction hardening; if the thickness of the hardened layer after the final induction hardening is smaller than that of the previously hardened layer, the final grain size through the thickness of the hardened layer becomes larger, decreasing the torsional fatigue strength.

The heating time of induction hardening is preferably less than 5 seconds, and more preferably less than 3 seconds to inhibit the grain growth of austenite and decrease the grain size of the hardened layer significantly.

Low heating rate and low cooling rate during induction hardening may enhance the grain growth of austenite, increase the grain size of the hardened layer, and decrease the torsional fatigue strength. Thus, the heating rate and the cooling rate are preferably 200° C./s or more, and more preferably 500° C./s or more.

EXAMPLE

Steels A-Y, A1, and B1, which have compositions shown in Table 1, were melted in a converter and cast continuously into blooms having a cross-section of 300×400 mm. These blooms were rolled into 150 mm square billets through a breakdown process. Then, the square billets were rolled into 24-60 mmφ steel bars and cooled at the cooling rates shown in Table 2. The finishing temperature in the rolling into steel bar was over 900° C., which was suitable for the formation of a structure of bainite or martensite.

Torsional fatigue test samples that had a parallel portion of 20 mmφ and a notch having a stress concentration factor α=1.5 were prepared from the rolled steel bars. These torsional fatigue test samples were heated at a heating rate of 800° C./s to different temperatures for different time periods, as shown in Tables 2-1, 2-2, and 2-3, and then quenched at a cooling rate of 1000° C./s, using an induction hardening apparatus operating at a frequency of 15 kHz. The induction hardening treatment like this was conducted twice or three times on some torsional fatigue test samples, as shown in Tables 2-1, 2-2, and 2-3. Then, the test samples were tempered in a furnace at 170° C. for 30 minutes. The induction hardened samples thus prepared No. 1-55 were subjected to the torsional fatigue test under the following conditions.

The torsional fatigue test was carried out with a torsional fatigue test machine having a maximum torque of 4900 N·m (=500 kgf·m) under different alternating stress conditions. The fatigue strength was measured as a strength at which the sample fractured at $1 \times 10^5$ times of torsional cycle.

For the samples prepared under the same conditions, structure before induction hardening, thickness and grain size (average prior austenite grain size) of the hardened layer formed after induction hardening were determined by means of a optical microscope.

The thickness and the grain size of the hardened layer were measured by the method described above. The grain sizes shown in Tables 2-1, 2-2, and 2-3 are the maximum grain size of the average austenite grain sizes measured at one-fifth, a half, and four-fifths of the thickness of the hardened layer. In the samples subjected to two or three times induction hardening, thickness of the hardened layer after each induction hardening, and grain size of the hardened layer after the final induction hardening were measured.

Tables 2-1, 2-2, and 2-3 show the results.

Samples 1-10, 12-23, and 37-52, which were prepared from the steel bars having our compositions and structures and were subjected to induction hardening, have a grain size of 12 μm or less of the hardened layer and therefore have a torsional fatigue strength of 700 MPa or more.

The comparison between samples 1 and 2 or between samples 4 and 5 shows that increasing the time of induction hardening from one to two decreases the grain size of the hardened layer and thus increases the torsional fatigue strength.

The comparison between samples 8, 37, and 38 shows that increasing the time of induction hardening from one to two makes the torsional fatigue strength of sample 37, which has a thinner thickness after the second induction hardening than a thickness after the first induction hardening, lower than that of sample 8, which is subjected to single induction hardening. On the other hand, sample 38, which has a thicker thickness after the second induction hardening than a thickness after the first induction hardening, has a significantly higher torsional fatigue strength than sample 8. In sample 38, the prior austenite grain size at a depth of four-fifths of the thickness of the hardened layer is 3.5 μm, and that at a depth of one-fifth of the thickness of the hardened layer is 2.6 μm. Thus, the small grain size in the surface seems to contribute to the increased torsional fatigue strength.

In samples 39-48, the Al content is controlled within a desired range of 0.05-0.10 mass %. Thus, the grain size of the hardened-layer is small and the torsional fatigue strengths becomes high.

On the other hand, in comparative sample 11, the total volume fraction of bainite and martensite is less than 10% because of a low cooling rate after rolling. This results in a large grain size of the hardened layer and a lower torsional fatigue strength.

Sample 24 has a small grain size of the hardened layer. However, a C content higher than our amount results in a low grain boundary strength and a low torsional fatigue strength.

Samples 25, 26, and 27, which have C, Si, and Mo content lower than our amounts, respectively, have a large grain size of the hardened layer and a low torsional fatigue strength.

Samples 28, 29, 30, and 31, which have B, Mn, S and P, and Cr content out of our amounts, respectively, have a low grain boundary strength and a low torsional fatigue strength.

Sample 32, which has Ti content higher than our amounts, has a low torsional fatigue strength. In contrast, sample 35, which has Ti content lower our amount, has a large grain size of the hardened layer and a low torsional fatigue strength.

Sample 33, in which the heating temperature of induction hardening is higher than ours, has a large grain size of the hardened layer. On the other hand, sample 34, in which the heating temperature of induction hardening is lower than ours, does not have a hardened layer. Both samples 33 and 34 have a low torsional fatigue strength.

Sample 36 has Si content of 0.28 mass %, which is lower than our amount, and a prior austenite grain larger than 12 μm through the thickness of the hardened layer and thus has a low torsional fatigue strength.

Samples 53, 54, and 55, which are free of Mo, as compared with samples 6, 4, and 3, which contain Mo, shows that Mo decreases a grain size of the hardened layer significantly when the heating temperature during hardening is below 1000° C.

While the example is described for the torsional fatigue strength, it is needless to say that other fatigue characteristics that involve destruction and crack extension at the prior austenite grain boundary, such as bending fatigue, rolling fatigue, and roller pitting fatigue, are also excellent.

TABLE 1

| Steel No. | Composition (mass%) | | | | | | | | | | | | | | | | Note |
| --- | --- | --- | --- | --- | --- | --- | --- | --- | --- | --- | --- | --- | --- | --- | --- | --- | --- |
| | C | Si | Mn | P | S | Al | Cr | Mo | Ti | B | N | Cu | Ni | Co | Nb | V | |
| A | 0.42 | 0.51 | 0.77 | 0.010 | 0.023 | 0.024 | 0.04 | 0.45 | 0.021 | 0.0022 | 0.0044 | — | — | — | — | — | Inventive |
| B | 0.47 | 0.77 | 0.55 | 0.010 | 0.015 | 0.022 | 0.02 | 0.30 | 0.026 | 0.0014 | 0.0042 | — | — | — | — | — | Inventive |
| C | 0.49 | 0.98 | 0.95 | 0.008 | 0.020 | 0.020 | 0.03 | 0.33 | 0.032 | 0.0022 | 0.0044 | — | — | — | — | — | Inventive |
| D | 0.55 | 0.62 | 0.96 | 0.009 | 0.038 | 0.029 | 0.03 | 0.15 | 0.017 | 0.0020 | 0.0048 | — | — | — | — | — | Inventive |
| E | 0.50 | 0.41 | 0.36 | 0.004 | 0.015 | 0.069 | 0.05 | 0.51 | 0.015 | 0.0018 | 0.0039 | — | — | — | — | — | Inventive |
| F | 0.48 | 0.90 | 0.60 | 0.012 | 0.020 | 0.025 | 0.04 | 0.39 | 0.020 | 0.0011 | 0.0058 | 0.3 | 0.44 | — | — | — | Inventive |
| G | 0.50 | 0.64 | 0.73 | 0.013 | 0.031 | 0.033 | 0.02 | 0.25 | 0.058 | 0.0033 | 0.0041 | — | — | 0.22 | 0.040 | 0.16 | Inventive |
| H | 0.48 | 0.91 | 0.60 | 0.012 | 0.020 | 0.025 | 0.18 | 0.39 | 0.020 | 0.0021 | 0.0043 | — | — | — | — | — | Inventive |
| I | 0.48 | 0.90 | 0.59 | 0.012 | 0.020 | 0.025 | 0.04 | 0.38 | 0.006 | 0.0022 | 0.0045 | — | — | — | — | — | Inventive |
| J | 0.49 | 0.91 | 0.59 | 0.013 | 0.021 | 0.025 | 0.04 | 0.39 | 0.019 | 0.0021 | 0.0044 | — | — | — | 0.050 | — | Inventive |
| K | 0.48 | 0.90 | 0.60 | 0.012 | 0.020 | 0.024 | 0.04 | 0.40 | 0.020 | 0.0022 | 0.0050 | — | — | — | — | 0.21 | Inventive |
| L | 0.48 | 0.90 | 0.60 | 0.012 | 0.021 | 0.025 | 0.04 | 0.38 | 0.020 | 0.0024 | 0.0038 | 0.4 | — | — | — | — | Inventive |
| M | 0.49 | 0.89 | 0.61 | 0.012 | 0.020 | 0.025 | 0.03 | 0.39 | 0.019 | 0.0020 | 0.0041 | — | 1.5 | — | — | — | Inventive |
| N | 0.48 | 0.90 | 0.60 | 0.013 | 0.020 | 0.026 | 0.03 | 0.39 | 0.021 | 0.0019 | 0.0040 | — | — | 0.45 | — | — | Inventive |
| O | 0.84 | 0.50 | 1.10 | 0.012 | 0.019 | 0.021 | 0.03 | 0.24 | 0.025 | 0.0018 | 0.0040 | — | — | — | — | — | Comparative |
| P | 0.26 | 0.62 | 0.90 | 0.013 | 0.022 | 0.023 | 0.03 | 0.14 | 0.022 | 0.0026 | 0.0044 | — | — | — | — | — | Comparative |
| Q | 0.46 | 0.06 | 0.69 | 0.012 | 0.023 | 0.031 | 0.01 | 0.32 | 0.018 | 0.0023 | 0.0032 | — | — | — | — | — | Comparative |
| R | 0.51 | 0.76 | 1.01 | 0.018 | 0.019 | 0.019 | 0.02 | — | 0.026 | 0.0032 | 0.0041 | — | — | — | — | — | Comparative |
| S | 0.49 | 0.44 | 1.04 | 0.013 | 0.014 | 0.028 | 0.04 | 0.20 | 0.023 | 0.0001 | 0.0037 | — | — | — | — | — | Comparative |
| T | 0.44 | 0.55 | 2.59 | 0.007 | 0.018 | 0.033 | 0.02 | 0.28 | 0.035 | 0.0001 | 0.0056 | — | — | — | — | — | Comparative |
| U | 0.47 | 0.34 | 0.89 | 0.039 | 0.083 | 0.024 | 0.02 | 0.36 | 0.025 | 0.0023 | 0.0049 | — | — | — | — | — | Comparative |
| V | 0.48 | 0.66 | 0.55 | 0.009 | 0.018 | 0.021 | 0.31 | 0.14 | 0.020 | 0.0019 | 0.0045 | — | — | — | — | — | Comparative |
| W | 0.53 | 0.81 | 0.93 | 0.012 | 0.018 | 0.026 | 0.03 | 0.41 | 0.150 | 0.0024 | 0.0045 | — | — | — | — | — | Comparative |
| X | 0.43 | 0.52 | 0.53 | 0.013 | 0.014 | 0.027 | 0.04 | 0.20 | 0.004 | 0.0023 | 0.0040 | — | — | — | — | — | Comparative |
| Y | 0.44 | 0.28 | 0.87 | 0.013 | 0.014 | 0.025 | 0.15 | 0.29 | 0.011 | 0.0018 | 0.0042 | — | — | — | — | — | Comparative |
| A1 | 0.42 | 0.50 | 0.77 | 0.011 | 0.022 | 0.072 | 0.04 | 0.45 | 0.020 | 0.0021 | 0.0045 | — | — | — | — | — | Inventive |
| B1 | 0.47 | 0.78 | 0.54 | 0.010 | 0.015 | 0.065 | 0.02 | 0.30 | 0.025 | 0.0015 | 0.0041 | — | — | — | — | — | Inventive |

*The underlined values are outside of the scope of the present invention.

TABLE 2-1

| Sample No. | Steel No. | Cooling rate after rolling (°C./s) | Bainite volume fraction (vol %) | Martensite volume fraction (vol %) | Ferrite grain size (μm) | Induction hardening condition | Times of induction hardening | Thickness of hardened layer (mm) 1st | 2nd | 3rd | Grain size of hardened layer (μm) | Torsional fatigue strength [1 × 10$^5$] (MPa) | Note |
|---|---|---|---|---|---|---|---|---|---|---|---|---|---|
| 1 | A | 0.7 | 81 | 0 | 17.9 | 880° C. × 2s | 1 | 3.5 | — | — | 4.5 | 818 | Inventive |
| 2 | A | 0.7 | 81 | 0 | 17.9 | 890° C. × 2s | 2 | 3.6 | 3.6 | — | 2.9 | 828 | Inventive |
| 3 | A | 0.7 | 81 | 0 | 17.9 | 1090° C. × | 1 | 4.4 | — | — | 11.1 | 704 | Inventive |
| 4 | B | 0.9 | 65 | 0 | 16.6 | 850° C. × 1s | 1 | 3.5 | — | — | 3.8 | 822 | Inventive |
| 5 | B | 0.9 | 65 | 0 | 16.6 | 850° C. × 1s | 2 | 3.5 | 3.5 | — | 2.6 | 879 | Inventive |
| 6 | B | 0.9 | 65 | 0 | 16.6 | 970° C. × 1s | 1 | 4.4 | — | — | 7.8 | 795 | Inventive |
| 7 | B | 12.5 | 9 | 91 | Not formed | 870° C. × 2s | 1 | 3.9 | — | — | 4.7 | 813 | Inventive |
| 8 | C | 0.6 | 88 | 0 | 14.9 | 830° C. × 3s | 1 | 3.5 | — | — | 3.2 | 850 | Inventive |
| 9 | C | 0.6 | 88 | 0 | 14.9 | 820° C. × 2s | 1 | 2.7 | — | — | 3.1 | 782 | Inventive |
| 10 | C | 0.6 | 88 | 0 | 14.9 | 820° C. × 1s | 1 | 2.2 | — | — | 3.0 | 766 | Inventive |
| 11 | C | <u>0.08</u> | <u>6</u> | 0 | 14.9 | 970° C. × 3s | 1 | 4.0 | — | — | <u>19.5</u> | 537 | Comparative |
| 12 | D | 0.7 | 28 | 0 | 12.5 | 900° C. × 3s | 1 | 3.5 | — | — | 5.2 | 835 | Inventive |
| 13 | D | 0.7 | 28 | 0 | 12.5 | 900° C. × 7s | 1 | 4.3 | — | — | 10.6 | 719 | Inventive |
| 14 | E | 0.8 | 25 | 0 | 14.2 | 890° C. × 1s | 3 | 3.9 | 3.9 | 3.9 | 2.6 | 870 | Inventive |
| 15 | F | 0.8 | 70 | 0 | 15.3 | 850° C. × 1s | 2 | 3.8 | 3.8 | — | 1.6 | 900 | Inventive |
| 16 | G | 0.7 | 83 | 0 | 14.1 | 940° C. × 2s | 2 | 3.9 | 3.9 | — | 3.8 | 826 | Inventive |
| 17 | H | 0.7 | 63 | 0 | 16.2 | 950° C. × 1s | 1 | 3.7 | — | — | 7.9 | 741 | Inventive |
| 18 | I | 0.8 | 63 | 0 | 16.9 | 970° C. × 1s | 1 | 4.1 | — | — | 8.0 | 787 | Inventive |
| 19 | J | 0.7 | 61 | 0 | 15.8 | 950° C. × 1s | 1 | 4.2 | — | — | 7.6 | 815 | Inventive |
| 20 | K | 0.8 | 64 | 0 | 16.0 | 950° C. × 1s | 1 | 3.9 | — | — | 7.8 | 826 | Inventive |

*The underlined values are outside of the scope of the present invention.

TABLE 2-2

| Sample No. | Steel No. | Cooling rate after rolling (°C./s) | Bainite volume fraction (vol %) | Martensite volume fraction (vol %) | Ferrite grain size (μm) | Induction hardening condition | Times of induction hardening | Thickness of hardened layer (mm) 1st | 2nd | 3rd | Grain size of hardened layer (μm) | Torsional fatigue strength [1 × 10$^5$] (MPa) | Note |
|---|---|---|---|---|---|---|---|---|---|---|---|---|---|
| 21 | L | 0.8 | 67 | 0 | 16.2 | 940° C. × 1 s | 1 | 3.7 | — | — | 5.0 | 822 | Inventive |
| 22 | M | 0.6 | 87 | 0 | 14.5 | 960° C. × 1 s | 1 | 3.7 | — | — | 7.6 | 830 | Inventive |
| 23 | N | 0.7 | 71 | 0 | 15.0 | 950° C. × 1 s | 1 | 4.0 | — | — | 7.7 | 817 | Inventive |
| 24 | <u>O</u> | 0.9 | 33 | 0 | Not formed | 950° C. × 1 s | 2 | 4.0 | 4.0 | — | 4.9 | 625 | Comparative |
| 25 | <u>P</u> | 0.5 | <u>8</u> | 0 | 20.7 | 950° C. × 2 s | 1 | 3.8 | — | — | <u>17.0</u> | 548 | Comparative |
| 26 | <u>Q</u> | 0.6 | 35 | 0 | 14.5 | 900° C. × 3 s | 1 | 3.9 | — | — | <u>13.9</u> | 590 | Comparative |
| 27 | <u>R</u> | 0.5 | 12 | 0 | 13.7 | 900° C. × 3 s | 2 | 4.1 | 4.1 | — | <u>13.7</u> | 583 | Comparative |
| 28 | <u>S</u> | 0.7 | <u>7</u> | 0 | 14.6 | 920° C. × 2 s | 1 | 3.9 | — | — | 11.1 | 586 | Comparative |
| 29 | <u>T</u> | 0.7 | 87 | 0 | 16.0 | 910° C. × 1 s | 1 | 3.6 | — | — | 4.2 | 675 | Comparative |
| 30 | <u>U</u> | 0.6 | 69 | 0 | 15.1 | 880° C. × 2 s | 1 | 3.8 | — | — | 4.0 | 655 | Comparative |
| 31 | <u>V</u> | 0.7 | 24 | 0 | 14.4 | 860° C. × 2 s | 2 | 3.8 | 3.8 | — | 3.9 | 657 | Comparative |
| 32 | <u>W</u> | 0.6 | 80 | 0 | 12.8 | 950° C. × 3 s | 1 | 4.0 | — | — | 5.9 | 562 | Comparative |
| 33 | A | 0.7 | 81 | 0 | 17.9 | <u>1150° C. × 7 s</u> | 1 | 6.5 | — | — | <u>13.6</u> | 615 | Comparative |
| 34 | A | 0.7 | 81 | 0 | 17.9 | <u>700° C. × 2 s</u> | 1 | 0 | — | — | <u>Unmeasurable</u> | 308 | Comparative |
| 35 | <u>X</u> | 0.7 | <u>7</u> | 0 | 17.5 | 960° C. × 1 s | 1 | 4.0 | — | — | <u>20.5</u> | 543 | Comparative |
| 36 | <u>Y</u> | 0.7 | 32 | 0 | 17.6 | 950° C. × 2 s | 1 | 4.8 | — | — | <u>15.5</u> | 575 | Comparative |
| 37 | C | 0.6 | 88 | 0 | 14.9 | *1 | 2 | 4.4 | 3.5 | — | 4.0 | 840 | Inventive |
| 38 | C | 0.6 | 88 | 0 | 14.9 | *2 | 2 | 2.2 | 4.0 | — | 3.5 | 872 | Inventive |

*The underlined values are outside of the scope of the present invention.
*1: First hardening: 1100° C. × 2 s, Second hardening: 850° C. × 2 s
*2: First hardening: 820° C. × 1 s, Second hardening: 850° C. × 2 s

TABLE 2-3

| Sample No. | Steel No. | Cooling rate after rolling (°C./s) | Bainite volume fraction (vol %) | Martensite volume fraction (vol %) | Ferrite grain size (μm) | Induction hardening condition | Times of induction hardening | Thickness of hardened layer (mm) 1st | 2nd | 3rd | Grain size of hardened layer (μm) | Torsional fatigue strength [1 × 10$^5$] (MPa) | Note |
|---|---|---|---|---|---|---|---|---|---|---|---|---|---|
| 39 | A1 | 0.7 | 80 | 0 | 17.8 | 880° C. × 2 s | 1 | 3.5 | — | — | 4.2 | 825 | Inventive |
| 40 | A1 | 0.7 | 80 | 0 | 17.8 | 890° C. × 2 s | 2 | 3.6 | 3.6 | — | 2.7 | 838 | Inventive |

TABLE 2-3-continued

| Sample No. | Steel No. | Cooling rate after rolling (°C./s) | Bainite volume fraction (vol %) | Martensite volume fraction (vol %) | Ferrite grain size (μm) | Induction hardening condition | Times of induction hardening | Thickness of hardened layer (mm) 1st | 2nd | 3rd | Grain size of hardened layer (μm) | Torsional fatigue strength [1 × 10⁵] (MPa) | Note |
|---|---|---|---|---|---|---|---|---|---|---|---|---|---|
| 41 | A1 | 0.7 | 80 | 0 | 17.8 | 880° C. × 0 s *3 | 1 | 3.4 | — | — | 3.9 | 788 | Inventive |
| 42 | A1 | 0.7 | 80 | 0 | 17.8 | 1090° C. × 6 s | 1 | 4.4 | — | — | 10.9 | 712 | Inventive |
| 43 | B1 | 0.9 | 64 | 0 | 16.7 | 850° C. × 1 s | 1 | 3.5 | — | — | 3.5 | 835 | Inventive |
| 44 | B1 | 0.9 | 64 | 0 | 16.7 | 850° C. × 1 s | 2 | 3.5 | 3.5 | — | 2.4 | 890 | Inventive |
| 45 | B1 | 0.9 | 64 | 0 | 16.7 | 940° C. × 0 s *3 | 1 | 3.5 | — | — | 4.6 | 817 | Inventive |
| 46 | B1 | 0.9 | 64 | 0 | 16.7 | 940° C. × 1 s | 1 | 3.5 | — | — | 4.8 | 815 | Inventive |
| 47 | B1 | 0.9 | 64 | 0 | 16.7 | 970° C. × 1 s | 1 | 4.4 | — | — | 7.6 | 800 | Inventive |
| 48 | B1 | 12.5 | 9 | 91 | Not formed | 870° C. × 2 s | 1 | 3.9 | — | — | 4.5 | 818 | Inventive |
| 49 | B | 0.9 | 65 | 0 | 16.5 | 940° C. × 0 s *3 | 1 | 4.3 | — | — | 4.8 | 815 | Inventive |
| 50 | B | 0.9 | 65 | 0 | 16.5 | 940° C. × 1 s | 1 | 4.2 | — | — | 5.1 | 816 | Inventive |
| 51 | A | 0.7 | 81 | 0 | 17.9 | 880° C. × 0 s *3 | 1 | 3.5 | — | — | 4.2 | 821 | Inventive |
| 52 | A | 0.4 | 60 | 0 | 18.2 | 880° C. × 0 s | 1 | 3.5 | — | — | 4.4 | 819 | Inventive |
| 53 | R | 0.8 | 40 | 0 | 13.5 | 970° C. × 1 s | 1 | 3.5 | — | — | 10.6 | 570 | Comparative |
| 54 | R | 0.8 | 40 | 0 | 13.5 | 850° C. × 1 s | 1 | 3.6 | — | — | 9.5 | 625 | Comparative |
| 55 | R | 0.8 | 40 | 0 | 13.5 | 1090° C. × 1 s | 1 | 3.5 | — | — | 14.1 | 514 | Comparative |

*The underlined values are outside of the scope of the present invention.
*3: 0 s means that heating was stopped immediately after the heating temperature and then cooling was started.

The invention claimed is:

1. A method for manufacturing an induction hardened member comprising the step of:

hot working a steel consisting of C: 0.35-0.7%, Si: 0.30-1.1%, Mn: 0.2-2.0%, Al: 0.005-0.25%, Ti: 0.005-0.1%, Mo: 0.05-0.6%, B: 0.0003-0.006%, S: 0.06% or less, P: 0.02% or less, Cr: 0.2% or less, by mass, and a balance of Fe and inevitable impurities;

cooling the hot worked steel at a cooling rate of at least 0.2° C./s, thereby manufacturing a steel product having a structure of bainite and/or martensite, the total volume fraction of bainite and martensite being 10% or more;

subjecting the steel product to induction hardening at least once, wherein the heating temperature of the final induction hardening is 800-950° C., wherein the thickness of a hardened layer formed on the surface of the steel product by induction hardening is 2 mm or more, and the prior austenite grain size of the hardened layer is 8 μm or less through the thickness of the hardened layer.

2. The method according to claim 1, wherein the steel subject to the hot working further comprising at least one selected from the group consisting of Cu: 1.0% or less, Ni: 3.5% or less, Co: 1.0% or less, Nb: 0.1% or less, and V: 0.5% or less, by mass.

3. The method according to claim 2, wherein the heating temperature of all the induction hardenings is 800-1000° C. and the heating temperature of the final induction hardening is 800-950° C.

4. The method for manufacturing an induction hardened member according to claim 3, wherein the heating time of all the induction hardenings is 5 seconds or less.

5. The method for manufacturing an induction hardened member according to claim 2, wherein the heating time of the final induction hardening is 5 seconds or less.

6. The method according to claim 1, wherein the heating temperature of all the induction hardenings is 800-1000° C. and the heating temperature of the final induction hardening is 800-950° C.

7. The method for manufacturing an induction hardened member according to claim 6, wherein the heating time of all the induction hardenings is 5 seconds or less.

8. The method for manufacturing an induction hardened member according to claim 1, wherein the heating time of the final induction hardening is 5 seconds or less.

* * * * *